United States Patent
Hoehn et al.

(10) Patent No.: US 12,330,617 B2
(45) Date of Patent: Jun. 17, 2025

(54) METHOD FOR OPERATING A BRAKE SYSTEM OF A MOTOR VEHICLE

(71) Applicant: ZF Active Safety GmbH, Koblenz (DE)

(72) Inventors: Andreas Hoehn, Dreikirchen (DE); Toni Streit, Waldbrunn (DE)

(73) Assignee: ZF Active Safety GmbH, Koblenz (DE)

( * ) Notice: Subject to any disclaimer, the term of this patent is extended or adjusted under 35 U.S.C. 154(b) by 184 days.

(21) Appl. No.: 17/980,777

(22) Filed: Nov. 4, 2022

(65) Prior Publication Data
US 2023/0136153 A1 May 4, 2023

(30) Foreign Application Priority Data
Nov. 4, 2021 (DE) .......................... 102021128764.2

(51) Int. Cl.
*B60T 8/1755* (2006.01)
*B60T 7/12* (2006.01)

(52) U.S. Cl.
CPC ............ *B60T 8/17554* (2013.01); *B60T 7/12* (2013.01); *B60T 2220/03* (2013.01);
(Continued)

(58) Field of Classification Search
CPC .... B60T 8/17554; B60T 7/12; B60T 2220/03; B60T 2230/03; B60T 2240/00;
(Continued)

(56) References Cited

U.S. PATENT DOCUMENTS

| 6,424,907 | B1* | 7/2002 | Rieth | .................... | G01M 1/122 |
| | | | | | 340/440 |
| 2005/0102084 | A1* | 5/2005 | Sakata | ................ | B60T 8/17554 |
| | | | | | 340/440 |

(Continued)

FOREIGN PATENT DOCUMENTS

| DE | 10325486 A1 | 1/2004 |
| DE | 102006037394 A1 | 2/2007 |

(Continued)

OTHER PUBLICATIONS

Search Report issued in German Appln. No. 102021128764.2 dated Jul. 15, 2022.

*Primary Examiner* — Navid Z. Mehdizadeh
*Assistant Examiner* — Shelley Marie Osterhout
(74) *Attorney, Agent, or Firm* — ROSSI, KIMMS & McDOWELL LLP

(57) ABSTRACT

In the case of a method for operating a brake system of an at least double-tracked motor vehicle (10) which comprises 2 breakable wheels (12$_L$, 12$_R$), which are arranged at opposite ends of an axle (14$_V$), and a rollover protection system, which can cause braking of the wheels (12$_L$, 12$_R$) in order to prevent a rollover situation, automatic braking of that wheel of the axle (14$_V$), which is loaded more greatly when cornering is brought about by way of the rollover protection system. Subsequently, a counter-steering movement is detected by way of a predefined steering angle change being exceeded in a predefined time period in the direction counter to the cornering direction, and, thereupon, a brake force is caused to be built up at the opposite wheel, which is loaded less greatly by way of the rollover protection system.

8 Claims, 4 Drawing Sheets

(52) U.S. Cl.
CPC ....... *B60T 2230/03* (2013.01); *B60T 2240/00* (2013.01); *B60T 2240/06* (2013.01); *B60T 2250/00* (2013.01); *B60T 2250/03* (2013.01); *B60T 2250/04* (2013.01); *B60T 2270/30* (2013.01)

(58) Field of Classification Search
CPC ............. B60T 2240/06; B60T 2250/00; B60T 2250/03; B60T 2250/04; B60T 2270/30; B60T 8/246
See application file for complete search history.

(56) References Cited

U.S. PATENT DOCUMENTS

| | | | | |
|---|---|---|---|---|
| 2007/0112498 | A1* | 5/2007 | Yasutake | B60T 8/17554 |
| | | | | 701/72 |
| 2011/0130923 | A1* | 6/2011 | Watanabe | B60T 8/1755 |
| | | | | 701/41 |
| 2019/0263368 | A1* | 8/2019 | Takahashi | B60W 10/04 |

FOREIGN PATENT DOCUMENTS

| | | |
|---|---|---|
| DE | 102007008486 A1 | 6/2007 |
| DE | 102006036680 A1 | 12/2007 |
| DE | 112009005073 B4 | 1/2011 |

* cited by examiner

METHOD FOR OPERATING A BRAKE SYSTEM OF A MOTOR VEHICLE

CROSS-REFERENCE TO RELATED APPLICATION

This application claims priority to German Priority application Ser. No. 102021128764.2, filed Nov. 4, 2021, the disclosure of which is incorporated herein by reference in its entirety.

TECHNICAL FIELD

The disclosure relates to a method for operating a brake system of multiple-track motor vehicle.

BACKGROUND

The brake systems of modern motor vehicles cooperate with a multiplicity of open-loop and closed-loop control systems in the vehicle. The systems intervene in the normal operation of the vehicle in a manner dependent on the driving situation, and cause an actuation of the brakes of individual wheels of the motor vehicle automatically. In other words the systems act independently of the actions of the vehicle driver, and therefore perform automated brake interventions. For example, the anti-lock braking system (ABS) prevents blocking of the wheels during braking and a traction control system (ASR) avoids spinning of the wheels.

It is further customary to provide an electronic driver assistance system to counteract swerving of the motor vehicle by braking individual wheels. This system is often called ESP. This system prevents oversteer of the motor vehicle, for example by braking the respective front wheel on the outside of the corner, whereas understeer is corrected by braking the respective rear wheel on the inside of the corner.

A rollover protection system is known as a further assistance system which detects indications for imminent lateral tilting of the motor vehicle and proactively prevents a rollover of the motor vehicle by throttling and braking individual wheels. This system is as rule activated when a possible imminent rollover situation is detected and brakes the wheel with the greatest loading, as a rule the outer front wheel. In addition, the outer rear wheel can also be braked.

Within the context of this application, open-loop and closed-loop control systems that can provide active safety are considered to be parts of a general driving dynamics system, wherein these parts communicate among one another.

The data, on the basis of which systems of this type make their decisions, is supplied by sensors in the motor vehicle which detect the respective variables.

SUMMARY

The disclosure describes improved automated brake operations by way of rollover protection system.

The disclosure describes a method for operating a brake system of double-track, or multiple-track, motor vehicle which comprises two breakable wheels, wherein the wheels are arranged at opposite ends of an axle, and wherein the vehicle comprises a rollover protection system that can cause braking of the wheels in order to prevent a rollover situation. To this end, the following steps are carried out:

causing of automatic braking of that wheel of the axle loaded more greatly when cornering by way of the rollover protection system, subsequently detecting a counter-steering movement when a predefined steering angle change is exceeded in a predefined time period in the direction counter to the cornering direction, and, thereupon, causing a brake force to be built up at the opposite wheel which is loaded less greatly by way of the rollover protection system.

This procedure corresponds for example to the situation of hard counter-steering in a corner or a swerving movement, in the case of which the counter-steering movement causes an impending rollover situation to be expected in the case of the directly imminent loading of the wheel, which has previously been loaded to a lesser extent on the current inner side of the corner. Therefore, the rollover protection system already proactively causes the build-up of a brake force at the brake of this wheel at this time, although the wheel load at this wheel at this time is still relatively low. In this way, this wheel is already braked before it becomes the wheel which is loaded more greatly. The brake effect therefore starts at an earlier time, which leads to improved stabilization of the vehicle.

Since the gradient of the brake force build-up is limited by the capacity of the brake system, in particular the power output of a pump and a hydraulic system or a mechanical drive, a higher maximum brake force can thus be generated by way of a longer lead time than if the build-up of the brake force begins only when the rollover protection system requires breaking of this wheel as standard at the time when it becomes the wheel which is loaded more greatly.

The rollover protection system can be designed, as is known, in such a way that the wheel of the axle which is loaded more greatly is always braked in the case of an impending rollover situation.

The brake system is generally designed in such a way that the brake force can be specified for each wheel individually and differently with regard to time, duration and magnitude.

The braking of the wheel, which is loaded to a lesser extent and is opposite on the axle can take place in the case of a counter-steering movement only if at the same time a vehicle lateral acceleration, a vehicle speed, a roll angle and/or a yaw rate of the motor vehicle exceed/exceeds a predefined value. The predefined value is dimensioned in such a way that exceeding for the specific vehicle in the specific driving situation might lead to a rollover event. The current values are advantageously provided by sensors which are present in the vehicle.

In order to avoid abrupt braking manoeuvres, a brake force request which is specified by the rollover protection system for the wheel which is loaded to a lesser extent is initially increased steadily and, as soon as this wheel becomes the wheel which is loaded more greatly, is increased rapidly. Since the brake force increase for the new wheel which is loaded more greatly does not begin at zero, but rather at the brake force value which has already been reached up to the time of the load change, a higher maximum brake force can be achieved, in particular, than if the build-up of the brake force began only at the load change.

Suitable data for determining the presence of a counter-steering movement can be obtained for example by detecting a steering wheel angle, a wheel lock angle, a roll angle, a yaw rate of the motor vehicle, a vehicle speed and/or a lateral acceleration of the motor vehicle.

The wheels which are braked by the rollover protection system can be the front wheels, and the axle is a front axle of the motor vehicle. It is optionally also possible for the braking of wheels on a rear axle of the motor vehicle to be caused by way of the rollover protection system in addition or as an alternative.

In addition, it is possible, during a direction change of a steering movement, for the two breakable wheels on the axle to be braked if the rollover protection system detects a phase with low lateral acceleration. This situation can occur, for example, in the case of a lane change or generally in the case of two corners with an opposite curvature which follow one another, where a brief straightahead driving phase necessarily occurs. An aim here, in a driving situation in which braking does not have a negative influence on the stability of the motor vehicle, is to dissipate kinetic energy. Here, an ABS system can of course act for example in an assisting manner in order to reduce the vehicle speed as greatly as possible.

It is also conceivable, during a direction change of a steering movement, if the rollover protection system detects a phase with low lateral acceleration, for all the wheels on all the axles to be braked if a particularly large amount of kinetic energy is to be dissipated.

An algebraic sign change of the lateral acceleration, the detection of a counter-steering movement and/or the detection of a change of the wheel which is loaded more greatly of an axle can be incorporated into the determination of the time to brake the two breakable wheels on an axle. All of these values are suitable for detecting a brief phase of straightahead driving, in which the two wheels can be braked without problems.

The double-sided braking of the wheels is ended, for example, when the rise in the lateral acceleration after a change in the algebraic sign or a rise in the yaw rate above a predefined value is detected. At this time, for example, the rollover protection system can change back again to single-sided braking of the wheel which is loaded more greatly, or can end the entire brake operation.

All the described method steps can always be carried out exclusively in driving situations, in which the rollover protection system is already active in its standard function, that is to say when an impending rollover situation has been detected.

It is fundamentally possible for the described rollover protection system to be used together with one or more autonomously operating assistance systems, for example an emergency steering assistance system, by which the current driving situation is handled without the influence of a human vehicle driver.

In general, a model of the driving dynamics of the vehicle can be stored in the driving dynamics system, with the result that the driving dynamics system knows the vehicle behaviour in certain driving situations and also fundamental vehicle data such as the centre of gravity and the wheelbase. These data are supplemented, for example, by current values which are supplied by the various sensors in the vehicle and are generally also available to the assistance systems.

An electronic open-loop and/or closed-loop control unit can be used as rollover protection system which can be realised, in particular, as an independent electronic unit or in an integrated manner in other vehicle systems, in particular the driving dynamics system.

BRIEF DESCRIPTION OF DRAWINGS

In the following, the disclosure provides greater detail with reference to the appended figures, in which.

DETAILED DESCRIPTION

Figure 1:
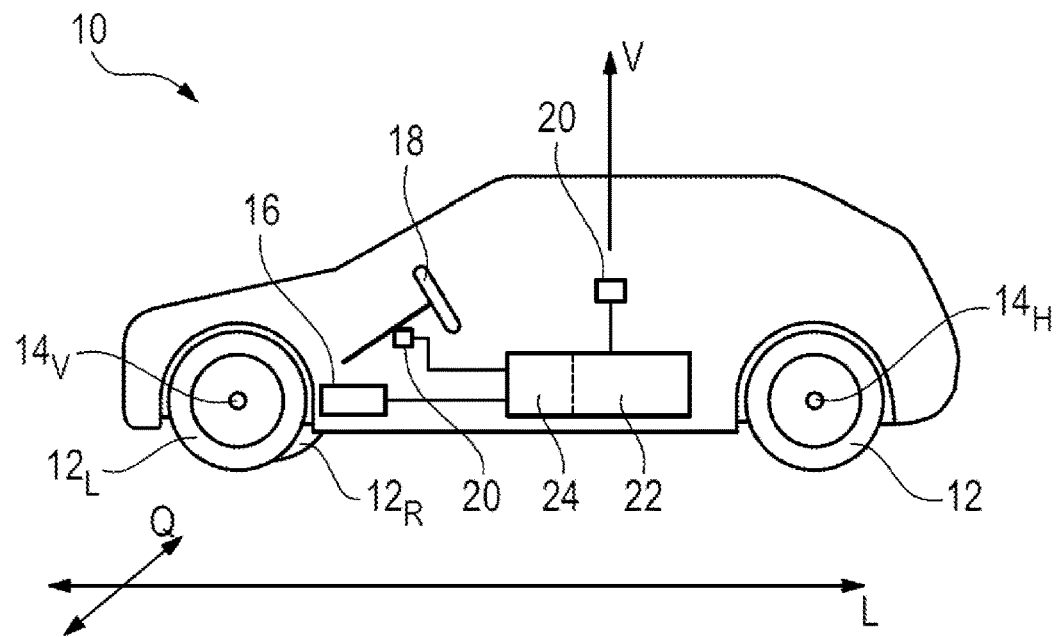
FIG. 1 shows a diagrammatic illustration of a motor vehicle with a brake system for carrying out a method according to the disclosure.

FIG. 1 shows a double-track motor vehicle 10 (here, a passenger car) with a total of four wheels 12 which are arranged on two axles 14 in such a way that in each case two wheels 12 are arranged at opposite ends of an axle 14. The axles 14 extend along the transverse direction Q of the motor vehicle 10, which transverse direction Q lies perpendicularly with respect to a longitudinal direction L.

One of the axles 14 is a front axle $14_V$, the two wheels 12 on this axle accordingly also being called a left-hand and right-hand front wheel $12_L$, $12_R$. The other axle 14 is a rear axle $14_H$ which supports the other two wheels 12.

In this example, all the wheels 12 can be braked independently and individually by way of a brake system 16 which is merely indicated in FIG. 1, it being possible for the time, duration and brake force F to be selected in a situation-dependent manner and individually for each wheel 12.

The brake system 16 can be of hydraulic design, electromechanical design, or can be designed in a combination consisting of hydraulic and electromechanical components.

Here, the driving direction of the motor vehicle 10 can be influenced via a steering wheel 18 which can be actuated by a vehicle driver.

As an alternative or in addition, it is also conceivable that the steering movement is taken over by an assistance system (not shown), or the motor vehicle 10 is generally designed for autonomous driving.

Various known sensors 20 and the motor vehicle 10 detect current values for suitable variables such as, for example, a steering wheel angle, a wheel lock angle, a vehicle speed, a yaw rate and a roll angle about a vertical axis V the of the motor vehicle 10, a transverse acceleration and similar variables, and possibly also data relating to the surrounding area of the motor vehicle 10.

The sensors 20 are connected to a general driving dynamics system 22, in which various active safety systems of the motor vehicle 10 are combined here, and in which a vehicle model is stored which allows predictions about how the motor vehicle 10 will behave in certain driving situations.

Moreover, there is a rollover protection system 24 which is designed here as part of the driving dynamics system 22 and which is designed to detect potential rollover situations and to take measures to prevent them. To this end, the rollover protection system 24 can fundamentally carry out the standardized procedure that, in the case of detection of a critical driving situation, it causes the wheel which is loaded more greatly of the two wheels 12 on the front axle $14_V$ and possibly also the wheel which is loaded more greatly of the two wheels 12 on the rear axle $14_H$ to be braked in an automated manner with a relatively high brake force F, in order to stabilize the motor vehicle 10 again. The respective brake requests are fulfilled by the brake system 16.

Both the driving dynamics system 22 and the rollover protection system 24 are realised here as purely electronic systems. They can be combined in a single electronics unit, or can be installed on a plurality of separate units in the motor vehicle 10.

Figure 2:
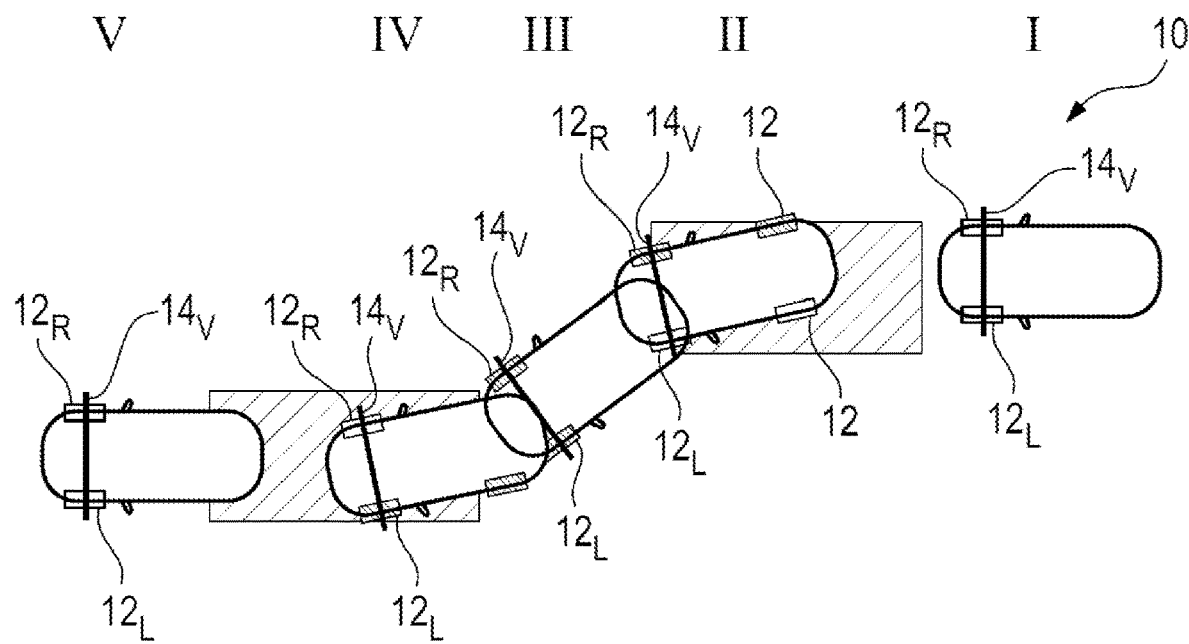
FIG. 2 shows a diagrammatic illustration of driving situations, in which the method according to the disclosure can be applied.

FIG. 2 shows a driving situation in steps I to V, in which, coming from the right, the motor vehicle 10 turns into a left-hand corner and describes a right-hand corner after a brief straightahead driving phase.

Figure 3:
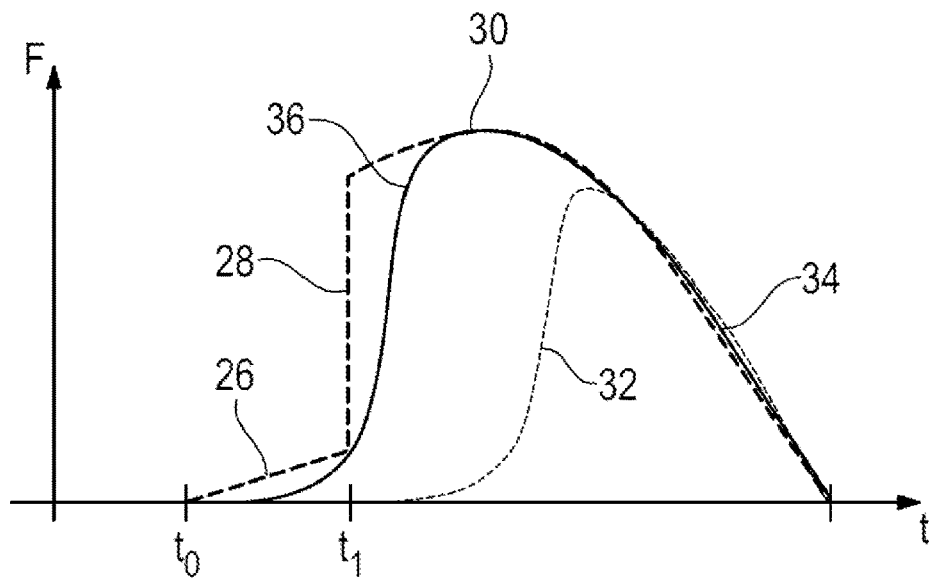
FIG. 3 shows a diagrammatic illustration of a brake force profile in accordance with a situation from FIG. 2.

FIG. 3 shows the profile of the brake force F for the left-hand front wheel $12_L$ in FIG. 2 during the left-hand corner.

Figure 4:
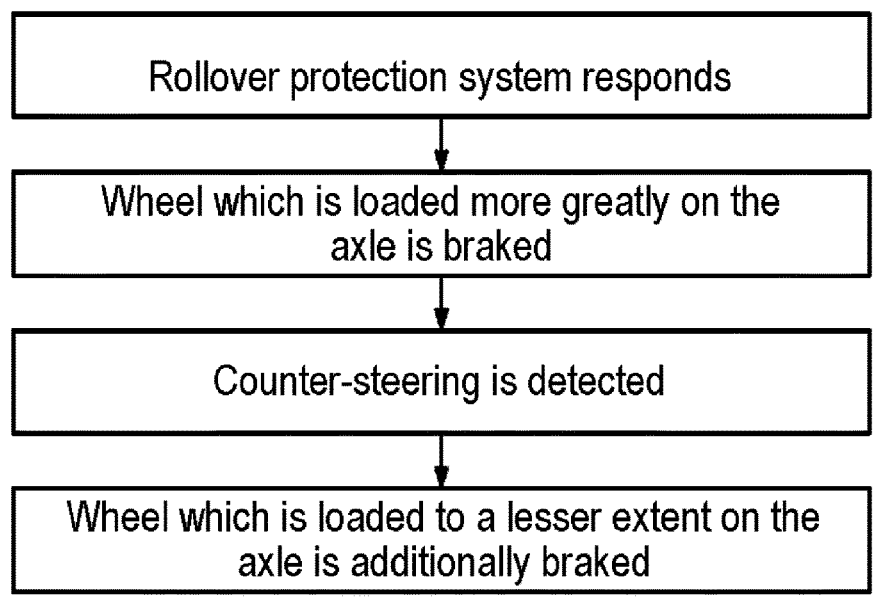
FIG. 4 shows a fundamental sequence of method steps of a method according to the disclosure.

FIG. 4 shows the fundamental procedure of a method to brake the motor vehicle 10 while driving around the left-hand corner.

The speed of the motor vehicle 10 and the curvature radius of the corner are such, in this example, that the rollover protection system 24 responds at the entry into the corner and already causes the front wheel $12_R$ which is on the outside of the corner and is loaded to a more pronounced extent on the front axle $14_V$ and, in this example, also the rear wheel 12 which is on the outside of the bend and is loaded more greatly on the rear axle to be braked (sections I and II in FIG. 2).

The braked wheels are in each case shown in red in FIG. 2.

In this situation, a violent counter-steering movement is detected, in the case of which a predefined steering angle change is exceeded in a predefined time period in the direction counter to the current corner direction. The predefined steering angle change in the predefined time period are selected in such a way, for example in general by the driving dynamics system 22, that a continuation of the risk of a rollover situation is to be expected if they are exceeded in the given conditions.

In order to assess the situation, current sensor values for the vehicle lateral acceleration, the vehicle speed, the roll angle and/or the yaw rate of the motor vehicle 10 are also used here, for which respective predefined values are likewise defined.

The predefined values can in general vary, for example, in a manner which is dependent on the driving situation, possibly also on the ambient conditions or loading of the vehicle. Values of this type are stored, for example, in the driving dynamics model of the driving dynamics system 22.

As a consequence of the detected counter-steering movement, in addition to the right-hand front wheel $12_R$ on the outside of the bend which is loaded more greatly and has already been braked up to now, the rollover protection system 24 causes the opposite front wheel $12_L$ which is on the inside of the corner and is currently loaded to a lesser extent to be braked (see section III in FIG. 2 and time to in FIG. 3).

As FIG. 3 illustrates, the brake force F is built up constantly here, starting from zero, with a relatively low gradient (see curve section 26).

As a result, the left-hand front wheel $12_L$ is already braked from this time $t_0$ with a small but rising brake force F.

At time $t_1$ in FIG. 3, the motor vehicle 10 has then moved counter to the first corner direction to such an extent that the load distribution changes, and the left-hand front wheel $12_t$ which is on the inside of the corner and was previously loaded to a lesser extent then becomes the wheel on the outside of the corner which is loaded more greatly (see section IV in FIG. 2). As FIG. 3 shows, the brake force request is then increased rapidly to just below the maximum value, which corresponds to the standard request of the rollover protection system 24 for the wheel which is loaded to a lesser extent (see curve section 28 in FIG. 3).

Since, however, the brake force F for the left-hand front wheel $12_L$ has already risen to a value which is different from zero, the maximum brake force is reached at an earlier time and also assumes a higher value than would be the case if the wheel $12_L$ were braked only from time $t_1$ in accordance with the standard of the rollover protection system 24 (see curve section 30 in FIG. 3 compared with the dashed line 32 in FIG. 3).

From time $t_1$, the right-hand front wheel $12_R$ which is then on the inside of the corner is no longer braked, since no further counter-steering movement has been detected or predicted in this example (section IV in FIG. 2).

Section V in FIG. 2 represents the situation, in which the motor vehicle 10 again moves during normal operation and a risk of a rollover is no longer predicted. The rollover protection system 24 accordingly at this time deactivates the braking operations on all the wheels 12, this taking place with a rapidly but constantly decreasing brake force F, as the curve section 34 in FIG. 3 shows.

The continuous line 36 in each case shows the actual profile of the brake force F at the respective wheel 12.

In another variant, FIG. 2 depicts the planned passing through of an S-shaped corner which is composed of a left-hand corner with a directly following right-hand corner. A driving situation of this type corresponds, for example, to a lane change.

In this situation, a steering assistance system can optionally have taken over vehicle steering, which steering assistance system has a suitable image of the surrounding area of the motor vehicle 10 available and which provides a prediction for the entire corner course which already comprises the planned counter-steering and the load change between the from wheels $12_L$, $12_R$.

The description of the driving situation is possible, for example, in a known way via a finite state machine which depicts all the states which the brake system 16 can assume for a situation of this type, and the possible state changes which lead to the states. A finite state machine of this type can form the basis of the software in the rollover protection system 24.

Figure 5:
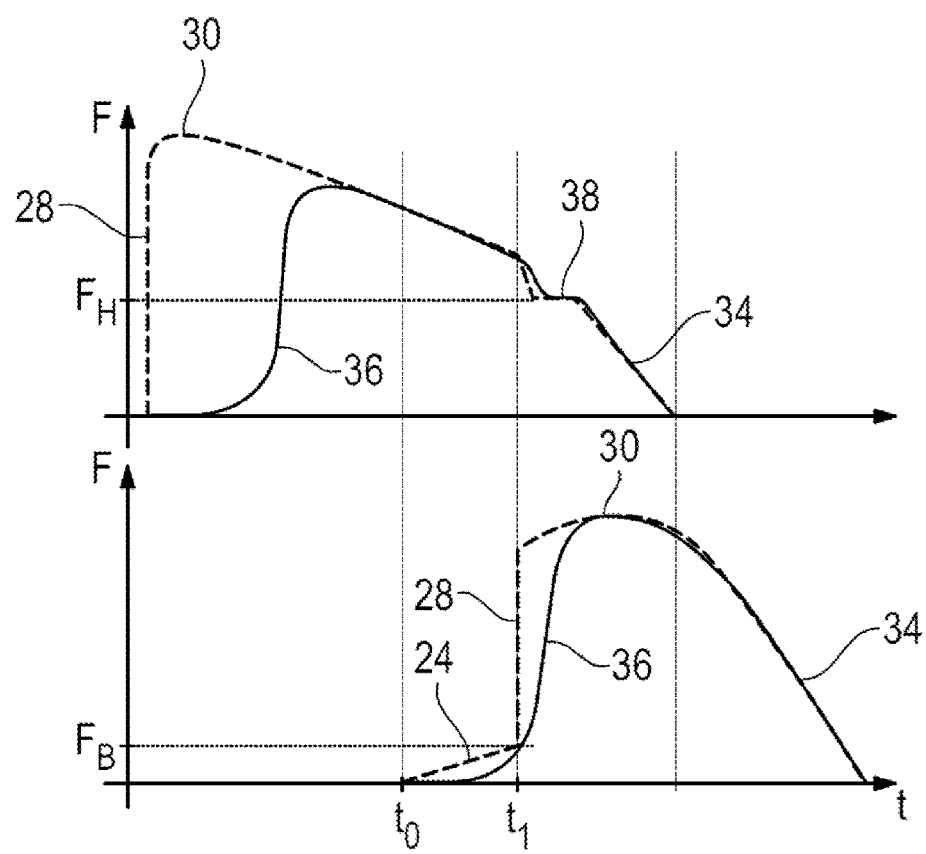
FIG. 5 shows a diagrammatic illustration of a brake force profile of a situation from FIG. 2.

The upper curve in FIG. 5 shows the brake force profile for the right-hand front wheel $12_R$ which is on the outside of the corner at the beginning, while the lower curve describes the left-hand front wheel $12_L$ which is on the inside of the corner at the beginning.

In this example, a potential rollover situation is detected at the beginning of the first steering movement into the left-hand corner, and the rollover protection system 24 causes breaking of the right-hand front wheel $12_R$ which is on the outside of the corner and, in this example, also of the rear wheel 12 which is on the outside of the corner.

To this end, the brake force request which is caused by the rollover protection system 24 is set suddenly to just under the maximum possible value and is then increased steeply but constantly to the maximum value (see curve sections 28, 30 in FIG. 5 at the top).

The brake force F which actually prevails at the respective wheel $12_L$, $12_R$ follows the specification of the curve sections 28, 30 (see in each case curve 36) with a corresponding time delay.

The left-hand front wheel $12_L$ is not yet braked at this time.

Since the left-hand corner is followed by a right-hand corner, a reversal of the corner curvature necessarily takes place which is associated with a brief straightahead driving phase (see section III in FIG. 2). During this directional change of the steering movement, in a phase with a low lateral acceleration, a small yaw angle and/or a small roll angle, the rollover protection system 24 causes the two wheels $12_L$, $12_R$ on the front axle $14_V$ to be braked, that is to say the left-hand front wheel $12_L$ which is currently loaded to a lesser extent to also be braked in addition to the right-hand front wheel $12_R$ are which is already braked.

In FIG. 5, this begins at time $t_0$, the brake force F being increased with a considerably smaller gradient than in section 28 of the curve to a value $F_B$ below the maximum brake force value (see curve section 26 in FIG. 5 at the bottom). Since only a slow rise in the brake force F is specified, the actually produced brake force F can follow this specification relatively promptly (see curve 36).

In this straightahead driving phase, the two front wheels $12_L$, $12_R$ are therefore braked, part of the kinetic energy of the motor vehicle 10 being dissipated. It would also be conceivable to increase the brake force F here rapidly to a higher value, in order to dissipate a maximum amount of kinetic energy of the motor vehicle 10 in this phase. The two wheels 12 of the rear axle $14_H$ might likewise be braked.

At time $t_1$, the effects of the counter-steering in the following corner section which is curved in an opposite direction can be seen, and a load change takes place for the left-hand front wheel $12_L$ which has up to now been loaded to a lesser extent and now becomes the wheel which is loaded more greatly. For this reason, the standard setting of the rollover protection system 24 also engages again at this time to brake the wheel which is loaded more greatly to a maximum possible extent, for which reason a sudden rise in the brake force F is requested (see curve section 28, 30 in FIG. 5 and section IV in FIG. 2).

At the same time, the brake force F at the right-hand front wheel $12_R$ which is then loaded to a lesser extent is reduced.

Since, however, the motor vehicle 10 is still situated in a (relative) straightahead driving state, the rollover protection system 24 causes the brake force F to be held at a middle level $F_H$ (see curve section 38) and therefore to still brake the two wheels $12_L$, $12_R$.

For example, a reduction and, moreover, an algebraic sign change of the lateral acceleration and/or the roll angle, a detection of a counter-steering movement and/or a detection of the change in the front wheel $12_L$, $12_R$ which is loaded more greatly are used to detect the beginning and the end of that phase of straightahead driving.

Here, the double-sided braking of the front wheels $12_L$, $12_R$ is ended, for example, when a rise in the lateral acceleration after an algebraic sign change or arise in the yaw rate or the roll angle beyond a predefined limit value is detected.

Figure 6:
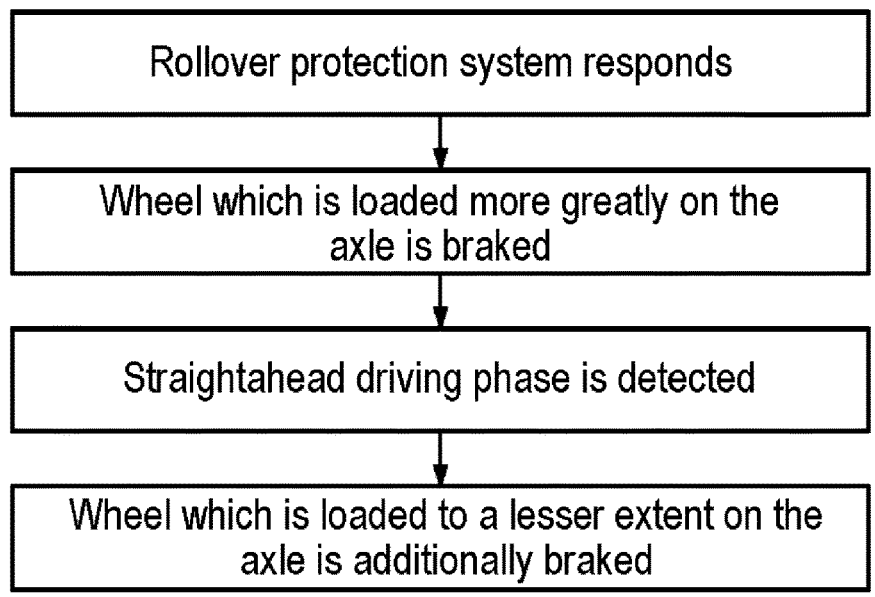
FIG. 6 shows a fundamental sequence of method steps of a method according to the disclosure.

The fundamental sequence of this method is shown in FIG. 6.

Figure 7:
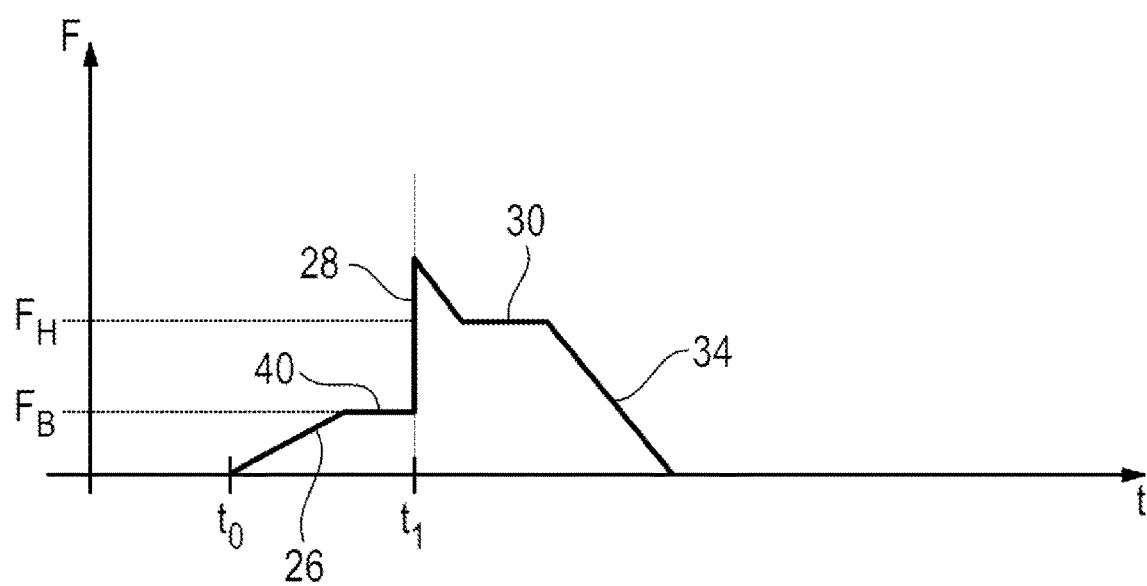
FIG. 7 shows a further diagrammatic illustration of a brake profile in accordance with a method according to the disclosure.

FIG. 7 shows an exemplary profile for the request of the brake force F by way of the rollover protection system 24.

At time $t_0$, the wheel 12 which is loaded to a lesser extent is braked, the brake force F being requested with a small, constant gradient in the curve section 26. The brake force F which is requested in this phase is limited to a maximum value $F_B$ which is considerably smaller than the maximum possible brake force value. If no load change of the wheels takes place, the brake force F is held at the level $F_B$. This is shown by the curve section 40.

Here, a load change occurs at time $t_1$, with the result that the wheel which has up to this time been loaded to a lesser extent then becomes the wheel which is loaded to a greater extent on the axle 14 under consideration. Accordingly, the rollover protection system 24 requests a sudden increase in the brake force F (curve section 28) as far as a considerably higher maximum value than the value $F_B$.

As a rule, only a relatively short brake pulse is set by way of this maximum value, with the result that the brake force request is rapidly reduced again.

In this case, however, a straightahead driving phase is still detected (the rollover protection system 24 also at the same time detecting a danger position), with the result that the wheel which is now loaded more greatly is braked further with a brake force request $F_H$, in order to continue to brake the two wheels 12 on the axle 14. Here, the brake force $F_H$ lies between the brake force $F_B$ and the maximum brake force (see curve section 38).

At the same time, the opposite wheel 12 (not shown here) which is currently loaded to a lesser extent on the axle 14 is braked at most with the brake force $F_B$.

If the danger situation is over, the brake force request is reduced constantly (see curve section 34).

It is generally possible that the rollover protection system 24 in each case only causes the wheels 12 on the front axle $14_V$ to be braked. It is also conceivable, however, for the wheels 12 on the rear axle $14_H$ to also be braked in addition or as an alternative.

The invention claimed is:

1. A method of operating a brake system of at least a double-track motor vehicle comprising two breakable wheels arranged at opposite ends of an axle, and a rollover protection system, wherein the rollover protection system can cause braking of the wheels in order to prevent a rollover situation, the method comprising:
   in a case where the rollover protection system detects a first potential rollover situation, causing of automatic braking of a first breakable wheel of the axle, which is an outer wheel opposite a first turning direction and which is loaded more greatly when the motor vehicle is cornering in the first turning direction, by way of the rollover protection system;
   while the first breakable wheel of the axle is being automatically braked during the cornering, detecting a counter-steering movement of the motor vehicle based on a predefined steering angle change being exceeded in a predefined time period in a second turning direction counter to the first turning direction;
   in response to detecting the counter-steering movement of the motor vehicle, causing of a gradual automatic braking of a second breakable wheel of the axle, which is an inner wheel toward the first turning direction and which is loaded less greatly than the first breakable wheel with a first brake force, by way of the rollover protection system, while continuing the automatic braking of the first breakable wheel during a direction change of the counter-steering movement, corresponding to a straightahead driving phase, in a case where a lateral acceleration, during the straightahead driving phase, is lower than a predefined threshold; and
   in a case where the rollover protection system detects a second potential rollover situation while the second breakable wheel of the axle is being automatically braked during the counter-steering movement of the motor vehicle with the first brake force, causing a reduction of the braking of the first breakable wheel to a middle level, that is held during the straightahead driving phase, and simultaneously causing a rapid automatic braking of the second breakable wheel of the axle, which is now loaded more greatly than the first breakable wheel, with a second brake force larger than the first brake force.

2. The method according to claim 1, wherein the second breakable wheel, which is loaded less greatly than the first breakable wheel, is only braked in the case of the counter-steering movement if at least one of a vehicle lateral acceleration, a vehicle speed, a roll angle and/or a yaw rate of the motor vehicle exceeds a predefined value at the same time.

3. The method according to claim 1, wherein the counter-steering movement is determined by way of detection of a steering wheel angle, a wheel lock angle, a yaw rate of the motor vehicle, a vehicle speed and/or a lateral acceleration of the motor vehicle.

4. The method according to claim 1, wherein the two breakable wheels which are caused to be braked by the rollover protection system are front wheels of the motor vehicle.

5. The method according to claim 1,
wherein the motor vehicle further includes at least two axles, with at least one wheel being arranged at each end of each axle, and
wherein all wheels on all axles are braked during the direction change of the counter-steering movement if the rollover protection system detects the phase with the lower lateral acceleration.

6. The method according to claim 1, wherein at least one of an algebraic sign change of the lateral acceleration and/or a roll angle of the motor vehicle, the detection of the counter-steering movement of the motor vehicle, and/or a detection of a change of a load of the second breakable wheel is incorporated into a determination of a time to brake the two breakable wheels.

7. The method according to claim 1, wherein the braking of the two breakable wheels is ended if a predefined rise in the lateral acceleration, after an algebraic sign change or a rise in the yaw rate beyond a predefined value, is detected.

8. The method according to claim 1, wherein an electronic open-loop and/or closed-loop control unit is used as the rollover protection system.

\* \* \* \* \*